United States Patent [19]

Walz et al.

[11] Patent Number: 4,942,828

[45] Date of Patent: Jul. 24, 1990

[54] CARRIER PLATFORM FOR THE TRANSPORT OF MOTOR VEHICLES

[75] Inventors: Reinhold Walz, Robdorf; Klaus Hildebrandt, Darmstadt; Udo Willgerodt, Weiterstadt, all of Fed. Rep. of Germany

[73] Assignee: Carl Schenck AG, Fed. Rep. of Germany

[21] Appl. No.: 355,465

[22] Filed: May 22, 1989

[30] Foreign Application Priority Data

May 26, 1988 [EP] European Pat. Off. ........ 88108383.6

[51] Int. Cl.$^5$ ............................................... A47G 29/00
[52] U.S. Cl. ......................................... 108/55.5; 410/7; 410/9; 254/89 R; 254/89 H; 414/240
[58] Field of Search ............................... 108/55.3, 55.5; 414/234–241; 410/30, 7, 9, 24, 25; 198/465.1, 465.2, 465.3, 803.1, 803.2; 29/33 P; 254/89–92

[56] References Cited

U.S. PATENT DOCUMENTS

| | | | |
|---|---|---|---|
| 2,720,036 | 10/1955 | Berger | 254/89 R |
| 3,240,364 | 3/1966 | Kapnek et al. | 414/240 X |
| 3,709,155 | 1/1973 | Pringle | 410/7 |
| 3,788,238 | 1/1974 | Bennett | 410/7 X |
| 4,307,985 | 12/1981 | Desprez et al. | 410/9 X |
| 4,679,974 | 7/1987 | Blunden | 410/30 |
| 4,768,914 | 9/1988 | Sing | 198/465.2 X |
| 4,848,732 | 7/1989 | Rossato | 254/89 H X |

Primary Examiner—Peter A. Aschenbrenner
Attorney, Agent, or Firm—Connolly and Hutz

[57] ABSTRACT

A carrier platform transports motor vehicles to be manufactured through assembly, test and other work stations. The platform remains with the motor vehicle at the assembly, test or other work stations and enables free access to the underside of the floor-pan of the vehicle and to the contact areas of its wheels for checking and measuring loads that actually occur at these areas. Support plates on the platform for the wheels of the vehicle are fashioned so as to simultaneously function as safety devices during the testing procedure. When horizontally positioned the support plates engagingly support the four wheels of the vehicle. During certain tests these support plates are vertically positioned and function as safety devices.

6 Claims, 5 Drawing Sheets

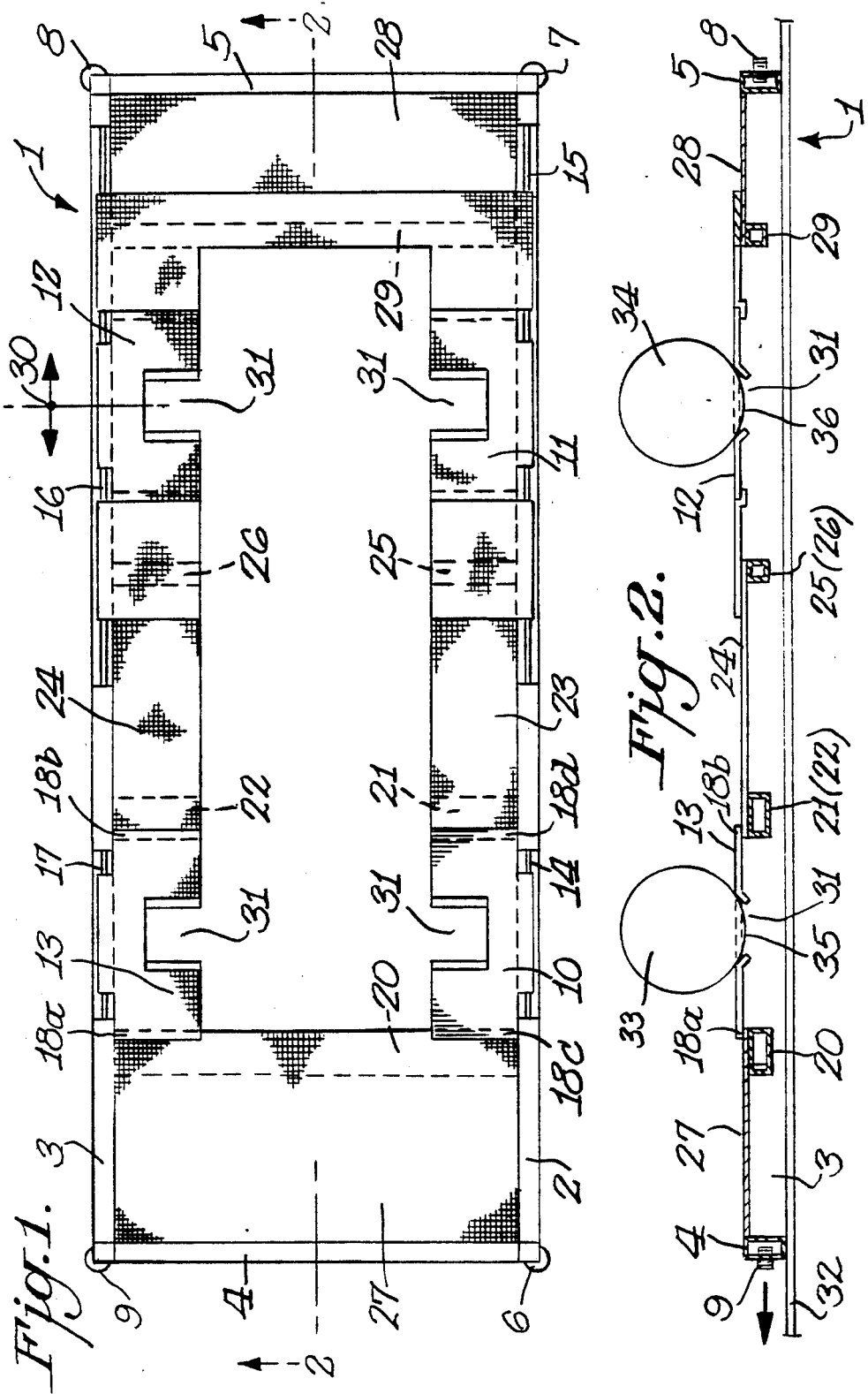

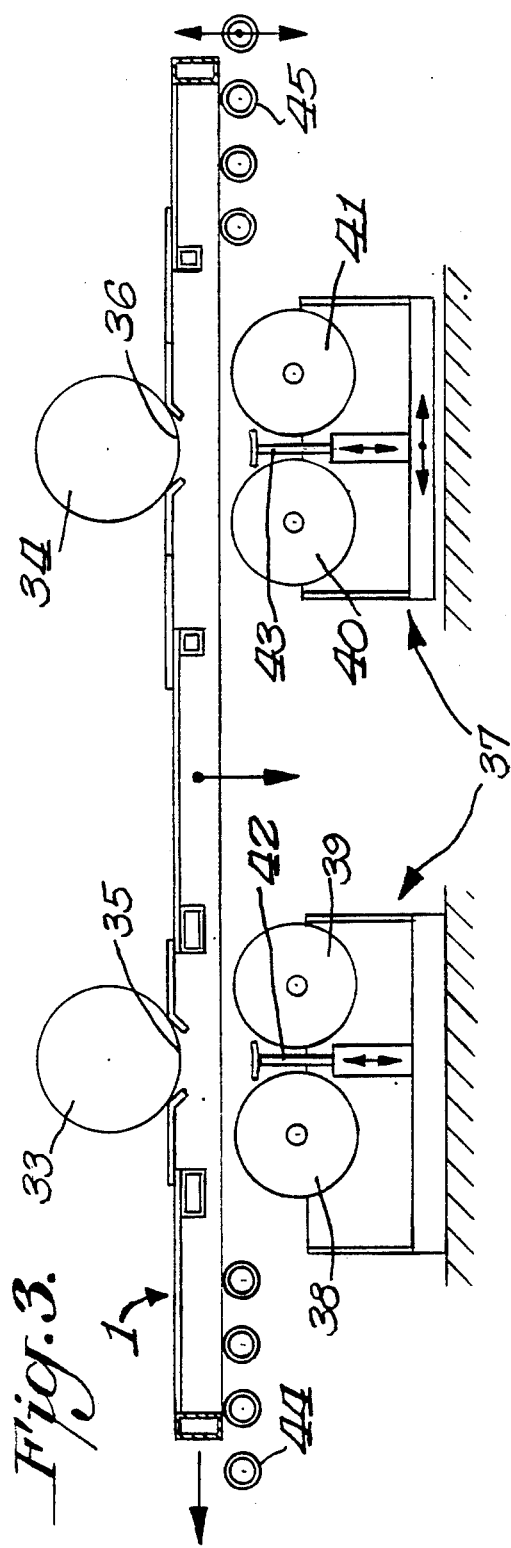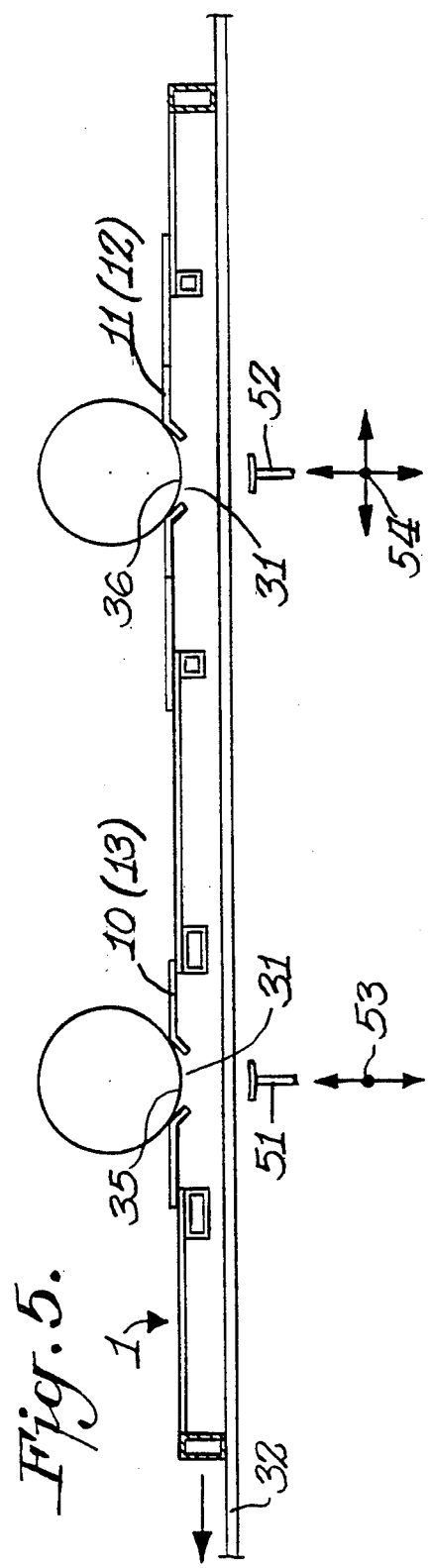

CARRIER PLATFORM FOR THE TRANSPORT OF MOTOR VEHICLES

BACKGROUND OF THE INVENTION

The invention relates to a carrier platform consisting of a transport frame and support plates especially designed for the transport of motor vehicles being manufactured through assembly tests and other work stations. The vehicle remains with the platform during the assembly, testing and other operations performed at various test stations.

During manufacturing and especially during final assembly, motor vehicles are transported through various test stations by means of in-line and cross or transfer conveyors which interconnect the individual test stations. The platform or skid remains with the vehicle during the test procedure at the respective test or work station even after separation from the motor vehicle. After completion of the tests and/or adjustments, the vehicle is either transported to the next test station or it may be driven away under its own power over and off of the supporting skid out of the last test station. This is also possible in the event of a breakdown, either in the area of final assembly or at one of the intermediate test stations, particularly if the checking stations in the assembly line are not arranged sequentially but laterally next to each other and the means of conveyance between the checking stations runs transverse to the longitudinal direction of the main assembly line. A facility of this type is disclosed in European Patent Specification No. 0 134 255.

In the aforementioned disclosure, the motor vehicle is transported through the interconnected checking stations by means of supports with wheels in rebound condition or by means of movable metal plates when the wheels are in jounce position. In order to make sure that motor vehicles transported with wheels in jounce position can be freed from the skid that remains in the test station, slots are provided in these plates through which means of support can reach and can act upon the vehicle wheels while metal support plates are moved to free the vehicle wheels. Subsequently the motor vehicle is set down with its wheels upon the test facility by lowering the aforementioned means of support. We are dealing here with a "closed-in skid" considering the state of the art at the time whereby the openings through which the vehicle wheels protrude should be freed.

SUMMARY OF THE INVENTION

The current requirement is to further shorten test times and to carry out other investigations simultaneously with certain test procedures. Also, in cases of rotating wheels, care must be taken to prevent unauthorized entering of the portion of the test stand driving the wheels. The invention allows free access to the vehicle floor-pan and simultaneously free access to the contact surfaces of the vehicle wheels during testing of wheeled vehicles, particularly during the manufacture thereof. The loads that will actually occur at the contact surfaces of the wheels as a result of driving conditions are checked and measured. Both the skid and the vehicle remain at the test or measuring station and the supports for the vehicle wheels are designed so as to simultaneously provide safety features.

As a result of a particular arrangement of placing four wheel support plates on the longitudinal frame spars of the platform or skid, free access to the complete floor-pan of the motor vehicle is achieved at a work station or test area.

According to the present invention, openings are provided in the support plates near the contact areas of the wheels. At least one of the two pairs of support plates are oriented toward each other and movably arranged along the spars to accommodate vehicles having different length wheel bases. Free access to the contact areas of the wheels is made possible without the need for further means of assistance. Measurement and test instrumentation including hydraulical, electrical or pneumatical cylinders can easily be brought in direct contact with the vehicle wheels by passing through the openings in the support plates. The openings in the support plates are designed so that motor vehicles of various tread width can be accommodated by the same platform. For this purpose each support plate has a longitudinal slot that opens toward the center of the platform. In this way it is possible to carry out tests on the contact area of the wheels, and also to simultaneously test the wheel suspensions by means of additional measuring devices such as vibration transducers that extend through the slots. The position of one pair of support plates relative to the other is adjustable so that the platform may accommodate vehicles having different wheel bases. Hence, a multiplicity of motor vehicle types can be transported by one and the same platform which remains with the vehicle at the test or work station while the test or work operations are conducted.

The open spaces between the support plates and cross spars of the platform are covered to prevent unauthorized entrance into these areas during operation. This prevents persons from falling between the platform and vehicle.

The areas between the front and rear of the vehicle and the cross spars of the platform is covered to prevent injury. Moreover, the arrangement of shafts and journals in the area of the longitudinal spars is protected by the support plates which swing to a vertical position to provide a safety barrier against unauthorized entry into the drive area when the vehicle wheels are elevated relative to the platform during a test procedure.

Each support plate may be associated with a movable tappet which engages the support in such a way that after supporting the wheels or their contact areas through lowering of the platform or lifting of the test facility or through simultaneous application of both actions, the support plates are brought from their horizontal or load carrying position to a vertical safety position. After completion of the test operation the support for each wheel is returned to its vehicle position. Springs may be used to return the support plates to their horizontal positions.

The platform of the present invention can also be used for serial investigation of fully assembled vehicles within the framework of prescribed spot check intervals. Moreover, the platform can be applied to vehicles that are not self propelled, such as trailers for motor vehicles, especially trailers for low bed trucks, for example.

BRIEF DESCRIPTION OF THE DRAWING

Novel features and advantages of the present invention in addition to those noted above will become apparent to those of ordinary skill in the art from a reading of the following detailed description in conjunction with the accompanying drawings wherein similar reference characters refer to similar parts and in which:

FIG. 1 is a top plan view of a carrier platform according to the present invention;

FIG. 2 is a longitudinal cross sectional view taken along line 2—2 of FIG. 1;

FIG. 3 is a longitudinal sectional view of the carrier platform at a test station;

FIG. 5 is a longitudinal sectional view of the carrier platform at another test station;

DETAILED DESCRIPTION OF THE INVENTION

Figure 4:
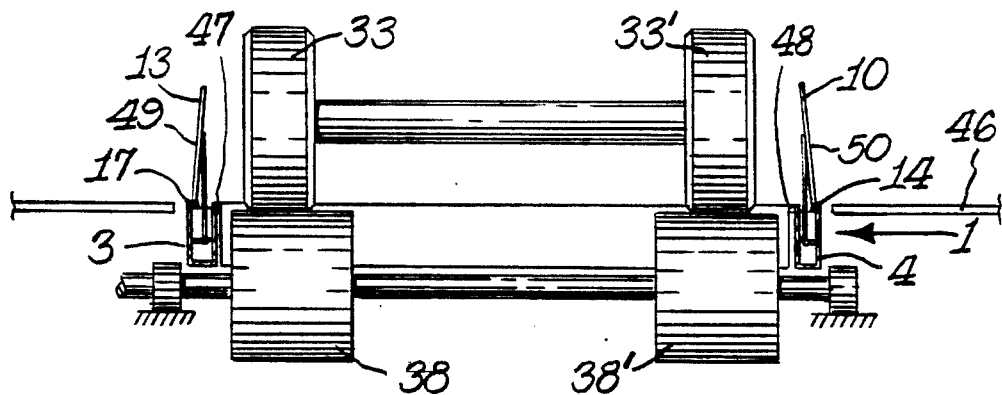
FIG. 4 is a cross sectional view of the carrier platform at the test station with a test stand in its elevated position.

Referring in more particularly to the drawings FIG. 1 illustrates a carrier platform or skid 1 essentially consisting of longitudinal spars 2, 3 and cross spars 4, 5 that collectively form a rectangular skid frame open on the inside thereof. Rollers 6, 7, 8 and 9 are arranged at the outer corners of the skid frame and the rollers guide the skid frame along lateral guides (not shown). If the skid frame is transported between individual test stations upon a live roller conveyor, for example, such live roller conveyor may consist of smooth rollers that support loaded and empty skids, and the skids are carried along on the live roller conveyor by friction resulting from the weight of the skids on the rollers. Belt conveyors may be used in place of a roller conveyor such as belt conveyors consisting of steel reinforced rubber or synthetic bands that pass underneath the longitudinal spars in the arrangement of an in-line conveyor or beneath the cross spars in the arrangement of a cross conveyor. The rollers 6, 7, 8 and 9 also function to guide the skid frame upon the belt conveyor.

Instead of these conveyor configurations, a roller conveyor with live flanged rollers may be used which contact the underside of the spars. The flanges provide guidance for the skid frame along the sides of the spars, and in this particular case rollers 6, 7, 8, and 9 are not required. If it also possible to transport the skid frame in empty or loaded condition by means of a compression drive where live rollers are pressed against the sides of the longitudinal spars 2 and 3 and thus afford a longitudinal translation of the skid frame. In this application the underside of the spars of the skid frame rest upon the smooth surface rollers.

Support plates 10, 11, 12 and 13 are rotatably secured to the longitudinal spars 2,3 by shafts 14, 15, 16 and 17, as shown best in FIG. 1. Catches 18a, 18b, and 18c, 18d extend from plates 10 and 13, respectively, and are supported upon a continuous support spar 20 over a cover 27 and, in addition, on partial support spars 21, 22 over covers 23, 24. Covers 23 and 24 are provided between the support plates 10 and 11 and the support plates 12 and 13, respectively. Each of the covers is connected on one side thereof to one of the partial support spars 21, 22 and on the other side to further partial support spars 25, 26. The covers 23 and 24 and the support plates 10, 11, 12 and 13 have the same width so that a completely fresh area is created for the inspection of the underside of the floor-pan of a motor vehicle located on the platform. Safety is established by preventing objects and unauthorized persons from accidentally entering between the contour of the vehicle and the skid frame.

The skid frame between cross spar 4 and support spar 20 is closed by a further cover 27. Another cover 28 extends over the width of the open area between covers 23 and 24 and a further support spar 29. Cover 28 has the width of the covers 23, 24 beyond support spar 29 in the direction of support plates 11 and 12. This makes it possible to shift the support plates 11 and 12 which are oriented toward each other to the left or right, as viewed in FIGS. 1 and 2, in a direction along the longitudinal spars 2, 3, as indicated by arrows 30. Thus vehicles of varying wheel base can be accommodated with one skid 1 having this adjustable feature without losing any advantages.

As indicated in FIG. 1, support plates 10, 11, 12 and 13 have identical openings 31 in the form of rectangular slots each open toward the inside area of the skid so that motor vehicles with varying tread width can also be investigated.

FIG. 2 shows skid 1 on a conveyor device that consists of several conveyor belts 32 only one of which is shown directly beneath spar 3. The wheels 33 and 34 of a motor vehicle, not otherwise shown, are supported by the support plates 12 and 13 whereby contact areas 35 and 36 of the wheels 33, 34, respectively, are accessible through the openings 31. Loading conditions in these areas can easily be checked during manufacturing of the motor vehicle, i.e. the actual loads that will occur at the contact areas during subsequent service.

The embodiment of FIG. 3 shows the area of a test station and a chassis dynamometer 37. After entry and positioning of the skid and vehicle at the test station, lifting device 42 for the front wheels and another lifting device 43 for the rear wheels are elevated. Lifting device 42 is located between a roller pair 38, 39 for the front wheels 33 of the motor vehicle and lifting device 43 is positioned between a roller pair 40, 41 for the rear wheels 34 of the motor vehicle. The lifting devices are elevated until they engage the contact areas 35 and 36 of the front wheels and rear wheels, respectively. In this way the motor vehicle is transferred onto the test stand.

Simultaneously, conveyor belt 32 is lowered so that skid 1 comes to rest upon the test station. In the example of FIG. 3, a flange roller conveyor 44 is shown instead of the belt conveyor 32 of FIG. 2. However, roller conveyor 44 is lifted and lowered in a vertical direction as indicated by the arrow 45 in FIG. 3. After skid 1 has been lowered far enough so that its upper edge coincides with the test stand, such as level 46 of FIG. 4, the lift devices 42 and 43 are sufficiently lowered until the front wheels and rear wheels engage between the roller pairs 38, 39 and 40, 41, of the chassis dynamometer. Prior to lowering of the lift devices 42,43, support plates 10, 11, 12 and 13 are shifted to their safety positions, as more fully described below in conjunction with FIGS. 4, 6 and 7.

As a result of the safety position of the support plates 10, 11, 12 and 13, work on the chassis dynamometer 37 can be carried out without any danger. Because the roller pair 40, 41 for the rear wheels can be shifted in the horizontal direction the test stand in combination with the skid 1 can also be used universally for vehicles with different wheel base lengths.

When the test is completed, the conveyor of lift and lowerable conveyor belts 32 according to FIG. 2 or lift and lowerable flanged rollers 44 is elevated so that skid 1 and the vehicle can be transported to the test stand level to the next test station by means of the conveyor. Prior to elevating the conveyor, the support plates are returned to their horizontal positions. In cases where the chassis dynamometer is the last test stand, the skid may remain in the lowered position after a successful last test and the vehicle can be driven away at the test stand level over and out of the skid.

FIG. 4 shows the cross section of the skid in its lowered position whereby, as a result of the rotatability of the support plates 10 and 13 around the shafts 14, 17, the support plates are moved over tipping edges 47 and 48, respectively, in an upward direction into a vertical position as the skid 1 is lowered. In the case of the tipping edges 47, 48, these are the lateral edges of a test stand, whose rollers 38, 38' are also depicted. This section from FIG. 4 is shown in greater detail in an enlarged representation according to FIG. 8. In FIG. 4 the front wheels 33 and 33' are shown in their lowered position. Roller pairs 38, 39 engage wheel 33 while roller pairs 38', 39' engage front wheel 33'.

Instead of tipping edges 47, 48 in the test stand it is also possible to provide vertically movable tappets 49, 50 that are also capable of moving each of the support plates 10, 11, 12 and 13 from the horizontal to the vertical position. Tappets 49, 50 are often used in cases other than chassis dynamometers where a lowering of the skid 1 is not required because the measurement and test instruments can be moved through opening 31 and can be applied directly to the contact surfaces of the vehicle wheels. In these applications, the conveyor devices need not be lowered. This is especially true for vibration test stands, alignment stands, test stands to determine steering movement and/or steering angle. These cases are where vehicles must be investigated, checked or repaired at regular intervals after manufacture. Also, in the case of the investigation of heavy components such as power plants and machinery, that may also be intended for stationary use, measurement and test instrumentation may be moved through the openings 31 without lowering the conveyor device, for instance when vibratory influences of these machines at their future location of use must be determined during manufacture and/or final assembly so that appropriate changes can be made.

FIG. 5 shows an example of this type of test or investigation where the skid 1 without being lowered remains upon a conveyor device consisting of several conveyor belts 32. Test instrumentations 51 and 52 adjustable to the wheel base and tread width of the vehicle to be investigated are brought into contact with the contact areas 35, 36 of the front and rear wheels. Contact occurs through openings 31 of the front support plates 10, 13 and rear support plates 11, 12. Instrument 51 moves up and down while instrument 52 moves in the same direction as well as to the right and left as indicated by the double arrows 53 and 54. Such movement may be made by hydraulic, pneumatic or electrical means.

Figure 6:
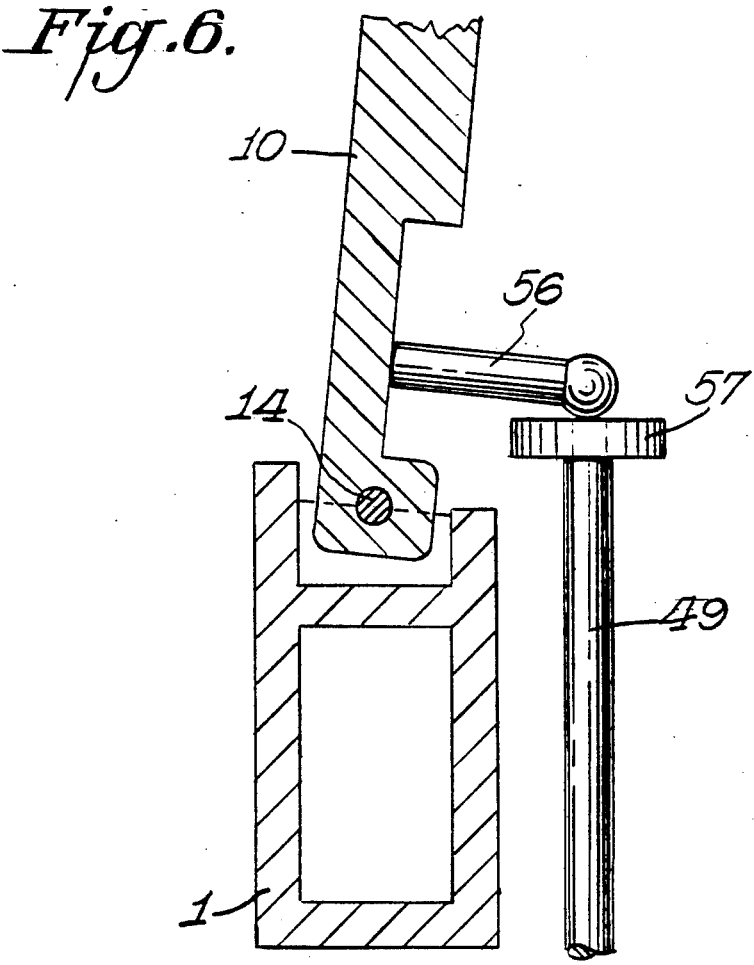
FIG. 6 is a cross sectional view of the carrier platform in the area of a support plate illustrating a lift mechanism for the support plate.

FIG. 6 shows the example of a support plate 10 and an arrangement for lifting this support plate. A vertically movable tappet 49 is positioned next to the longitudinal spar 2 over a holding device 55. After the component to be investigated has been positioned in the test or measurement facility and has become free of the support plate 10, an arm 56 is engaged by the head 57 of the tappet. Through the vertical movement of the tappet 49 the support plate is upwardly tilted into a vertical position. As noted above, the support plate is rotatably supported by shaft 14.

Figure 7:
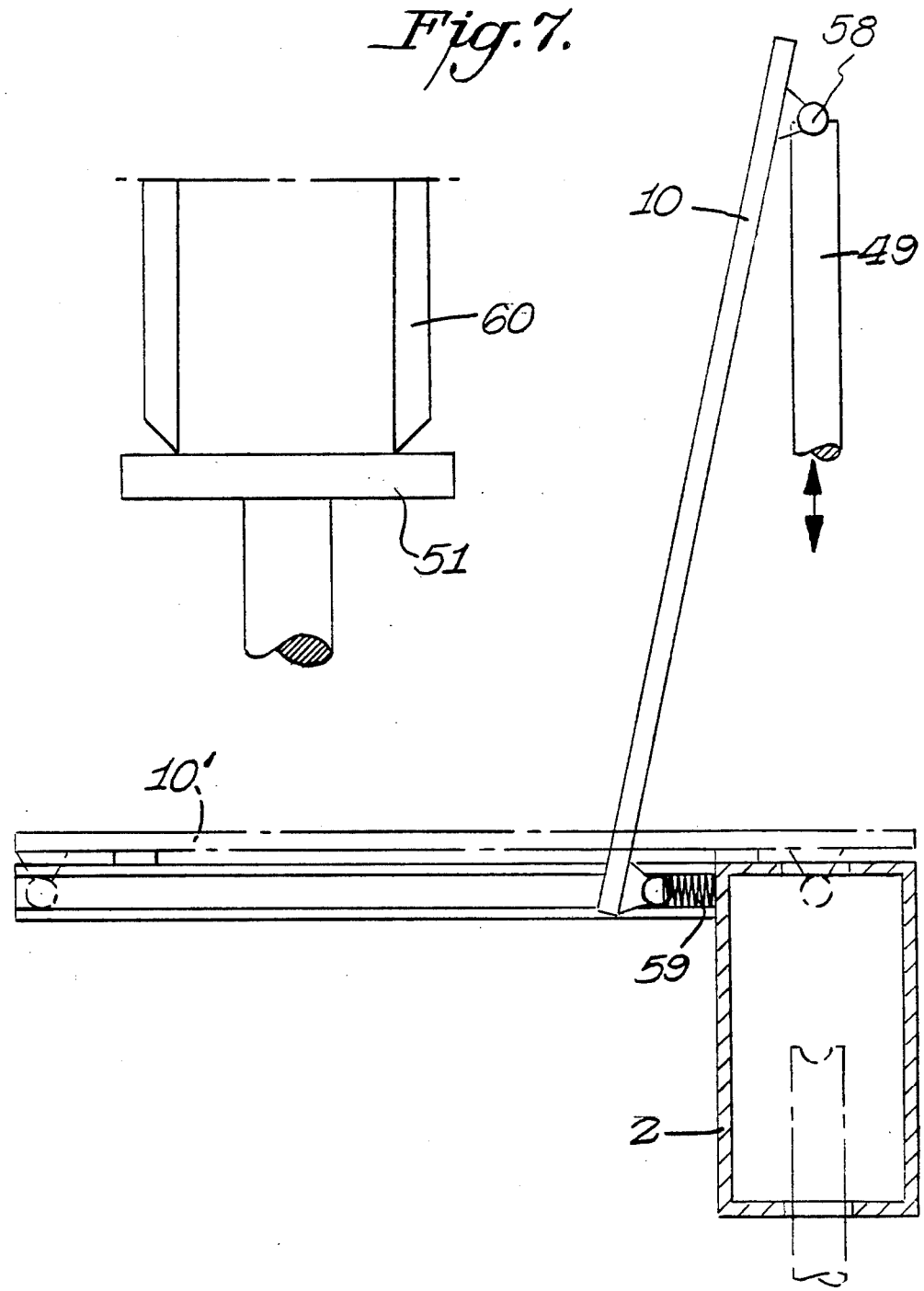
FIG. 7 is a cross sectional view of the carrier platform in the area of the support plate but illustrating another lift mechanism for the support plate.

FIG. 7 shows another lift mechanism for the support plate 10. Through a vertically movable tappet 49 arranged inside the longitudinal spar 2, the support plate 10 is engaged via catch 58 and is upwardly tilted against the force of a spring 59 from its horizontal position 10' into a vertical position 10. As the vertically extended tappet 49 is lowered, spring 59 provides the force for the return of the support plate to its horizontal position. It is assumed in this case that a vibration test device 51 supports the wheel 60 of a component that is to be investigated.

Figure 8:
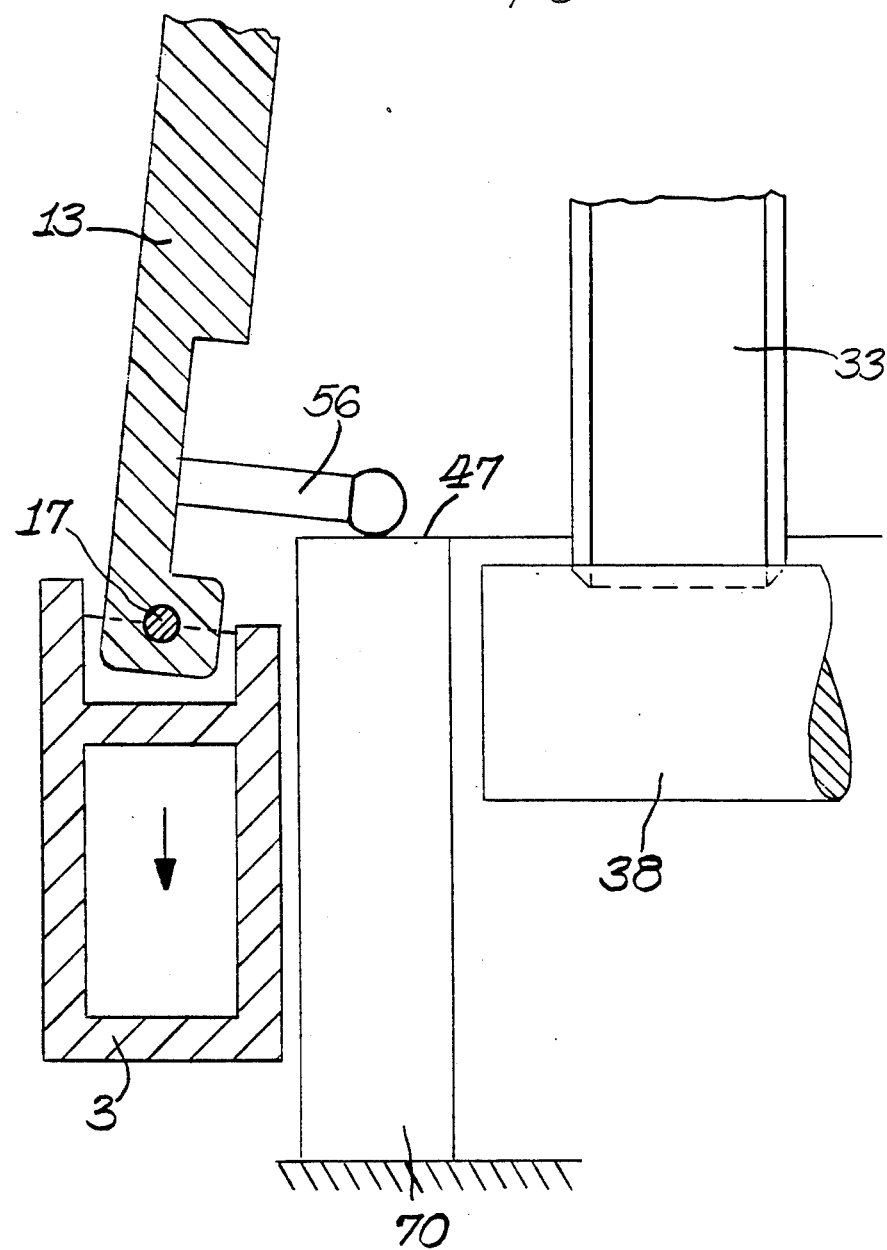
FIG. 8 is a cross sectional view of the carrier platform in the area of a support plate illustrating an alternative lift mechanism for the support plate.

FIG. 8 shows the skid in its lowered position on an enlarged scale. The support spar 3 is equipped on its upper end with the shaft 17, above which the support plate 13 is rotatably positioned. When the support spar 3 is moved downwards, the arm 56—if this arm has been positioned on the support plate 13—is folded away upwards over the tipping edge 47 of a schematically depicted test stand 70 so that the schematically depicted wheel 33 can be placed onto the roller 38.

What is claimed is:

1. A carrier platform for transporting motor vehicles and the like through assembly, test and other work stations comprising a transport frame with four individual support plates connected thereto and arranged to supportingly engage vehicle wheels, the transport frame including a pair of spaced apart longitudinal spars to which the support plates are connected, two plates to each spar, and wherein the support plates include an opposed front pair constructed and arranged to engage the front wheels of a vehicle being transported and an opposed rear pair that engage the rear wheels of such vehicle, each of the support plates having an opening therein for cradling the wheels of the vehicle being transported, at least one of the opposed pairs of support plates including a slidable connection to the longitudinal spars whereby the opposed pairs are movable toward and away from one another to accomodate vehicle having different wheel base lengths.

2. A carrier platform as in claim 1 including a central opening therein and cover means connected to the framework for covering portions of the platform between the framework and the central opening.

3. A carrier platform as in claim 2 wherein the boundary of the central opening is defined by inside edges of the support plates and inside edges of the cover means.

4. A carrier platform as in claim 1 including shaft means secured to the longitudinal spars and hinge-like connectors on each of the support plates secured to the shaft means whereby each of the support plates is rotatably mounted to the framework for movement between a horizontal wheel supporting position and a vertical position.

5. A carrier platform as in claim 4 including motivating means for moving each of the support plates from its horizontal wheel supporting position to its vertical position and vice versa.

6. A carrier platform as in claim 5 wherein the motivating means for each support plate includes a tappet engaging the underside of the plate and means for raising and lowering the tappet.

* * * * *